US005971309A

United States Patent [19]
Yamaguchi

[11] Patent Number: 5,971,309
[45] Date of Patent: Oct. 26, 1999

[54] HANDLE OF A FISHING REEL

[75] Inventor: Nobuyuki Yamaguchi, Tokyo, Japan

[73] Assignee: Daiwa Seiko, Inc., Tokyo, Japan

[21] Appl. No.: 09/113,560

[22] Filed: Jul. 10, 1998

[30] Foreign Application Priority Data

Jul. 10, 1997 [JP] Japan .................................... 9-200851

[51] Int. Cl.[6] .................................................... A01K 89/00
[52] U.S. Cl. ............................................... 242/283; 74/545
[58] Field of Search ............................... 242/283; 16/121; 74/553, 557

[56] References Cited

U.S. PATENT DOCUMENTS

| | | | |
|---|---|---|---|
| 5,150,853 | 9/1992 | Bernard et al. | 242/283 |
| 5,255,573 | 10/1993 | Estabrook | 74/553 |
| 5,284,400 | 2/1994 | Thomas | 74/553 |
| 5,328,122 | 7/1994 | Yamaguchi | 242/283 |
| 5,577,678 | 11/1996 | Murayama | 242/283 |
| 5,690,290 | 11/1997 | Asano et al. | 242/283 |

FOREIGN PATENT DOCUMENTS

| | | |
|---|---|---|
| 63-15776 | 2/1988 | Japan . |
| 8-89140 | 4/1996 | Japan . |

*Primary Examiner*—Katherine A. Matecki
*Attorney, Agent, or Firm*—Sughrue, Mion, Zinn, Macpeak & Seas, PLLC

[57] ABSTRACT

A handle of a fishing reel in which a knob can be very easily replaced with another one, which is always free from deterioration, damages, and the like, and in which a knob that is most suitable can be selectively used. A handle knob is locked and supported via a support shaft on a rotating member for winding a fishing line around a spool, the knob is insertable into and detachable from an outer periphery of a cylinder member which is locked and supported on the support shaft in a rotatable manner, and the knob is locked to the cylinder member by an engaging member in a detachable manner.

3 Claims, 7 Drawing Sheets

HANDLE OF A FISHING REEL

BACKGROUND OF THE INVENTION

The present invention relates to a handle of a fishing reel having an improved structure for inserting and detaching a knob.

Conventionally, a handle arm which is rotatably attached to the reel body for winding a fishing line around a spool of a fishing reel is provided with a knob of a desired shape which is grasped by a user's hand to perform a winding operation. In order to improve the adaptability and holdability in the winding operation, the knob is made of a cork material, a soft resin material, or the like. Such a handle arm is known in, for example, Japanese utility model publication (Kokai) No. SHO63-15776.

However, the holdability cannot be satisfactorily maintained for a long term, because of deterioration due to a lapse of use, sticking of seawater or water contents, the slime of fish, or the like, damages caused by contacts with foreign members, or other reasons. Furthermore, since the knob is not easily detached, different knobs which are most suitable to situations including the type of fish, the fishing conditions, and the personal taste of the fisherman cannot be selectively used.

Another structure in which a knob rotatably supported on a support shaft of a handle arm can be detached from the support shaft by removing a cap of the knob and a lock ring engaged with the support shaft in the knob is disclosed in, for example, Japanese patent publication (Kokai) No. HEI8-89140. However, removing and opening the cap in a narrow space is cumbersome, and the structure is complicated. Further, this knob suffers from the same disadvantages mentioned in the paragraph above.

In view of the above-discussed disadvantages, it is an object of the invention to provide a handle of a fishing reel in which a knob can be very easily replaced with another one, which is always free from deterioration, damages, and the like, and in which the most suitable knob can be selectively used.

SUMMARY OF THE INVENTION

In order to solve these problems, in a handle of a fishing reel in which a handle knob is locked and supported via a support shaft on a rotating member for winding a fishing line around a spool, the knob is insertable into and detachable from an outer periphery of a cylinder member which is locked and supported on the support shaft in a rotatable manner, and the knob is locked to the cylinder member by an engaging member in a detachable manner.

According to the invention, when a knob is to be replaced with another knob because of deterioration due to a lapse of use, sticking of seawater or water contents, the slime of fish, or the like, damages caused by contacts with foreign members, or other reasons, the knob can be easily detached by loosening an engaging member such as a screw. Therefore, the most suitable knob for type of fish, the fishing conditions, and the personal taste of the knob can be selected and easily attached. Consequently, the replacement can be conducted very easily, and the holdability of the knob can be satisfactorily maintained for a long term.

The present disclosure relates to the subject matter contained in Japanese patent application No. Hei. 9-200851 (filed on Jul. 10, 1997) which is expressly incorporated herein by reference in its entirety.

DETAILED DESCRIPTION OF THE PREFERRED EMBODIMENTS

Hereinafter, the invention will be described by way of illustrated embodiments.

Figure 1:
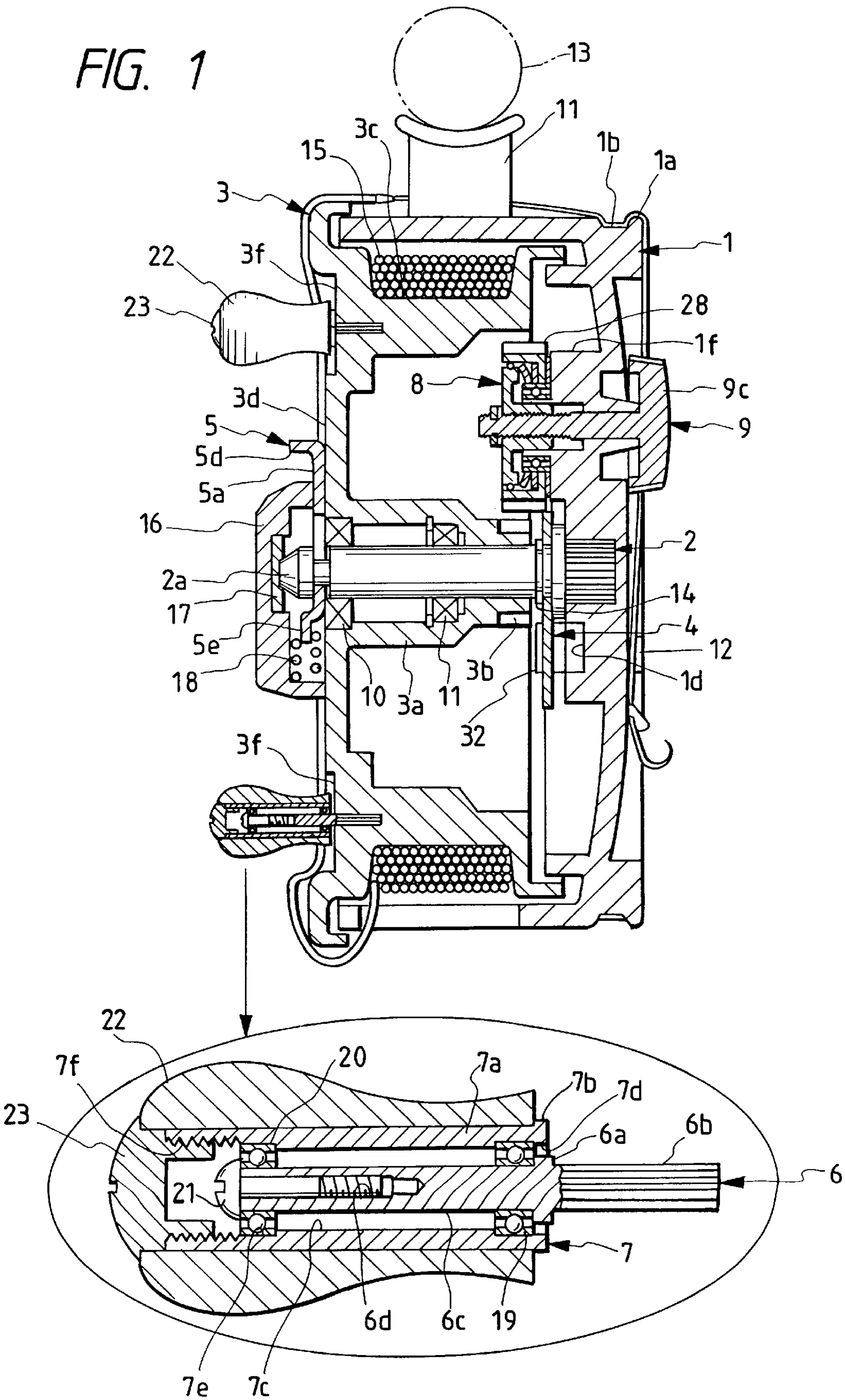
FIG. 1 shows a sectional view and partial enlarged sectional view of a single bearing type fishing reel which is a first embodiment.

In the single bearing type fishing reel, as shown in FIG. 1, one end of a support shaft 2 is fixed to the center of the reel body 1 by means of press fitting or the like, so as to be projected therefrom.

A shaft cylinder 3*a* which is formed integrally with the center of a rotating member 3 consisting of a spool is rotatably fitted onto the support shaft 2 and pivotally supported by bearings 10 and 11.

An annular recess 1*b* on which a fishing line can be wound is formed in an outer peripheral portion 1*a* of the reel body 1 which is on the side opposite to the rotating member 3 consisting of a spool.

A plate-like line stopper 12 is fixed to a side face of the reel body 1.

A leg 1*c* is formed integrally with the upper portion of the reel body 1 and a fishing rod 13 is to be attached to the leg.

A gear 3*b* is formed on the outer periphery of one side of the shaft cylinder 3*a* of the rotating member 3 consisting of a spool. A swing plate 4 of the drag brake mechanism which uses the gear 3*b* as an inner ring is fitted onto the support shaft 2 and locked thereto by an E-ring 14.

A spool barrel 3*c* is formed on the outer periphery of the rotating member 3 consisting of a spool. A fishing line 15 is wound on the spool barrel.

Figure 2:
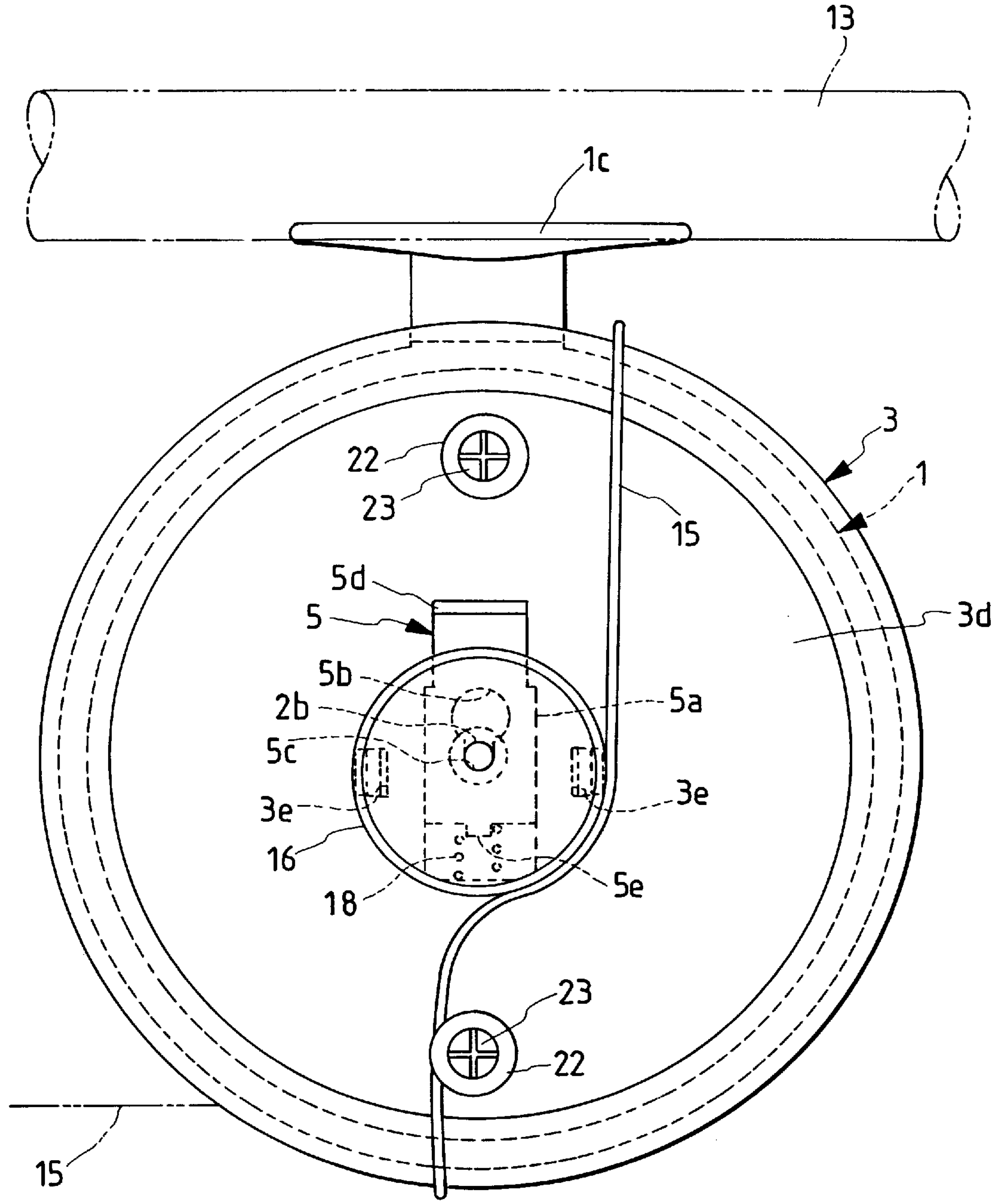
FIG. 2 is a side view of the single bearing type fishing reel.

The tip end 2*a* of the support shaft 2 projects from the center side face 3*d* of the rotating member 3 consisting of a spool. Referring to FIG. 2, an engaging portion 3*e* consisting of a through hole is formed in each of the side faces 3*d* on the sides of the support shaft 2 in FIG. 2. A cap 16 is attached to the side faces 3*d*.

A thrust bearing 17 is mounted in the recess of the cap 16. The tip end 2*a* of the support shaft 2 abuts against the bearing.

An engaging member 5 and a spring 18 are inserted into the recess of the cap 16 so that the engaging member 5 is upward urged by the spring 18.

The engaging member 5 has a rectangular sliding portion 5*a*. As shown in FIG. 2, a large circular hole 5*b* and a small circular hole 5*c* are opened in the sliding portion 5*a* so as to partly overlap with each other. A bent portion 5*d* is formed on the upper portion of the sliding portion 5*a*, and a bent projection 5*e* is formed on the lower side of the sliding portion 5*a*.

The spring 18 is engaged with the bent projection 5*e*, and a peripheral groove 2*b* of the support shaft 2 is inserted into the large circular hole 5*b* and engaged with the small circular hole 5*c,* whereby the rotating member 3 consisting of a spool is caused to detachably engage with the support shaft 2.

When the rotating member 3 consisting of a spool is detached from the support shaft 2, the upper shoulders of the sliding portion 5*a* of the engaging member 5 abut against step portions in the recess of the cap 16, thereby preventing the engaging member from slipping off.

A flange 6*a* which is in one side of a support shaft 6 of a handle knob abuts against a flange 3*f* of the side face of the rotating member 3 consisting of a spool. One end 6*b* is embedded.

Figure 5:
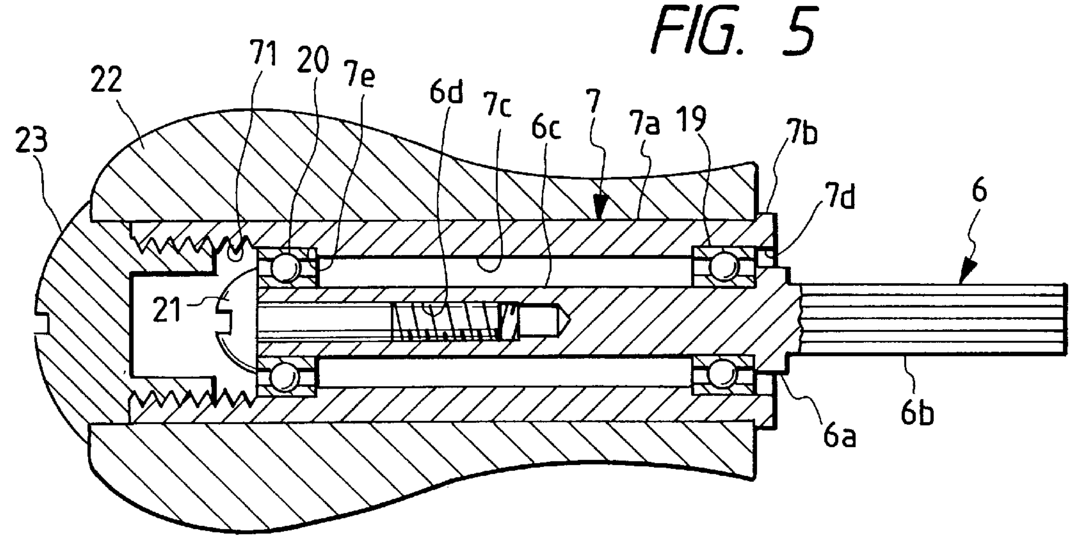
FIG. 5 is an enlarged section view of a handle.
Figure 6:
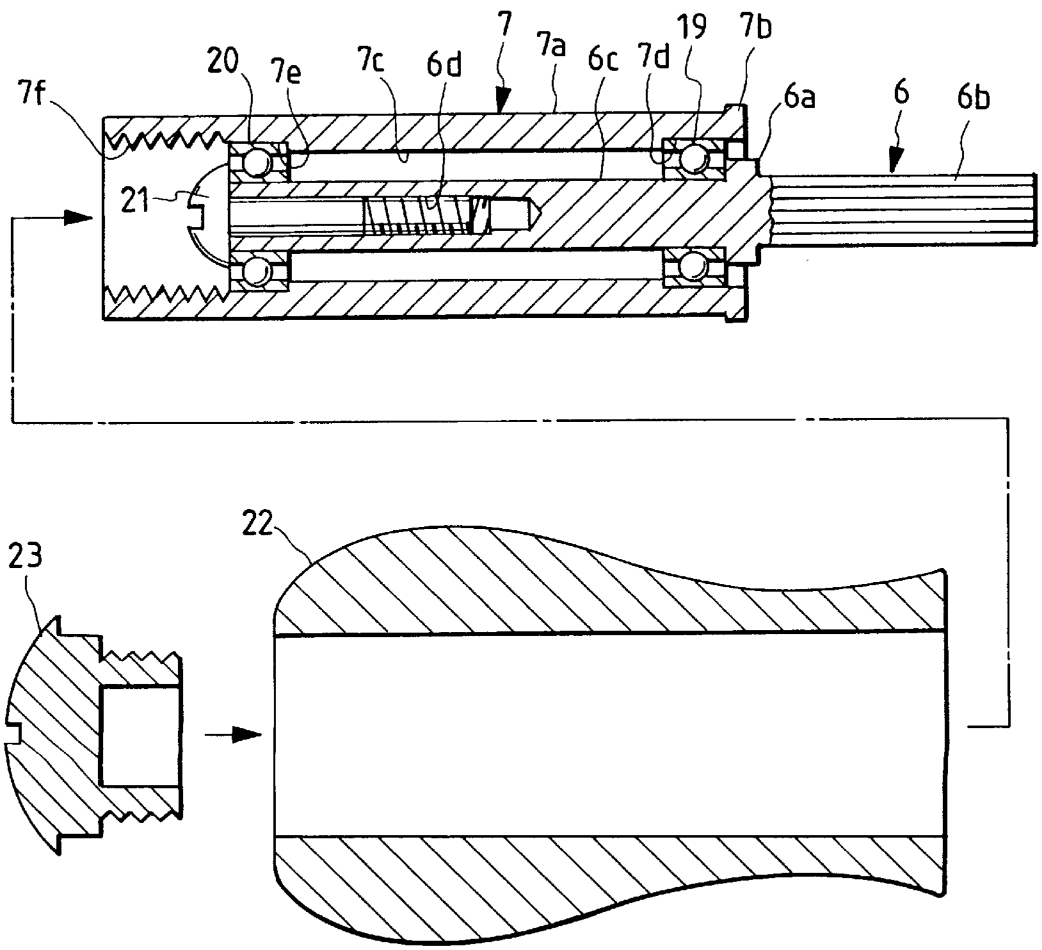
FIG. 6 is an enlarged exploded section view of the handle.

As shown in FIGS. 1, 5, and 6, a cylinder member 7 is rotatably fitted onto the outer periphery of a shaft portion 6*c* of the support shaft 6, via bearings 19 and 20. A screw 21 is screwed with a tapped hole 6*d* formed in the other side of the shaft portion 6*c* of the support shaft 6, thereby preventing the cylinder member 7 from slipping off.

The cylinder member 7 comprises: a cylinder portion 7*a;* a flange 7*b* on the outer periphery which is in one side of the cylinder portion 7*a;* a small-diameter hole 7*c* in the cylinder portion 7*a;* a large-diameter hole 7*d* in the one side of the cylinder portion 7*a;* a large-diameter hole 7*e* in the other side of the cylinder portion 7*a;* and a tapped hole 7*f* in the other side of the cylinder portion 7*a*.

A knob 22 made of a cork material or a soft synthetic resin material is fitted onto the outer periphery of the cylinder portion 7*a* of the cylinder member 7, and prevented from slipping off, by an engaging member 23 such as a screw which is screwed with the tapped hole 7*f*.

Figure 3:
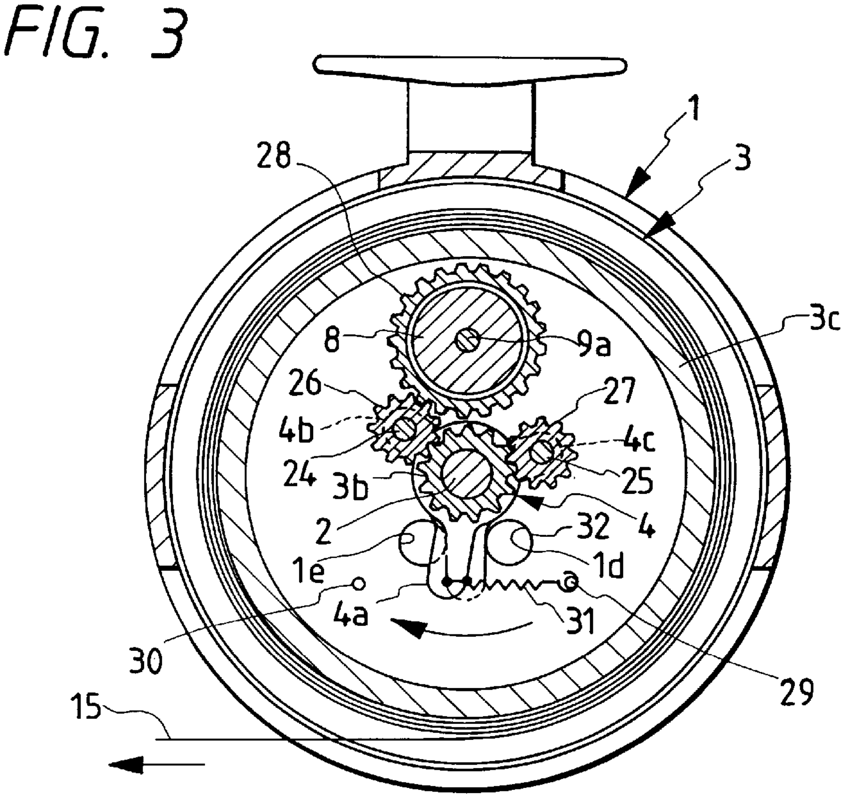
FIG. 3 is a section side view of the single bearing type fishing reel in the state where it is operated by a right-hand handle.
Figure 4:
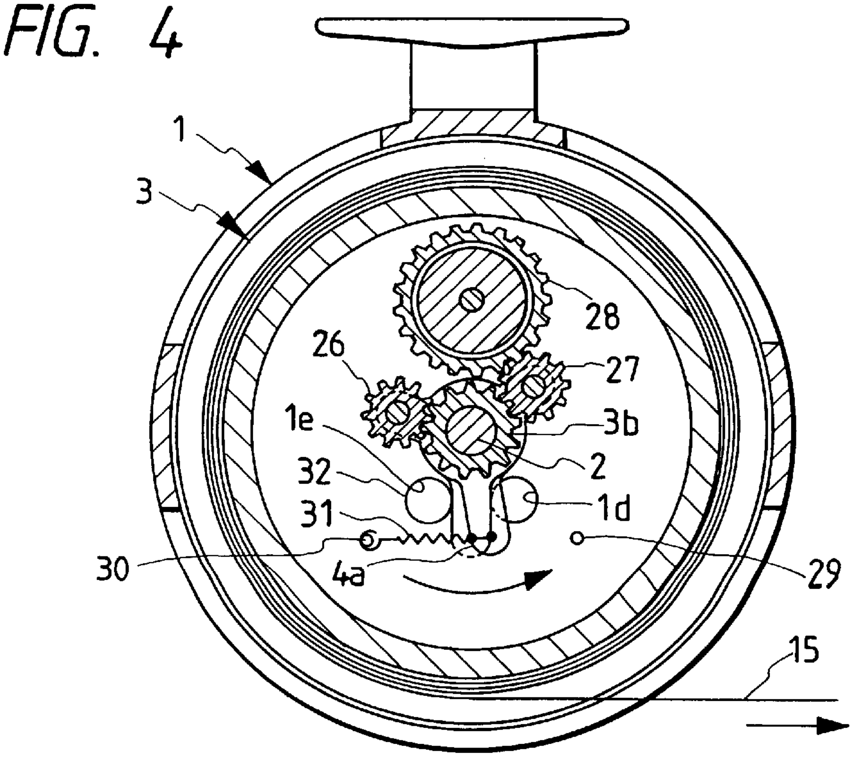
FIG. 4 is a section side view of the single bearing type fishing reel in the state where it is operated by a left-hand handle.

In the swing plate 4 of the drag brake mechanism, as shown in FIGS. 1, 3, and 4, a long limiting arm 4*a* and two arms 4*b* and 4*c* are formed, shafts 24 and 25 are fixed to the arms 4*b* and 4*c*, respectively, and transmission gears 26 and 27 are rotatably fitted onto the shafts 24 and 25, respectively.

The transmission gears 26 and 27 always mesh with the gear 3*b* of the rotating member 3 consisting of a spool, and are meshably opposed to a drag brake gear 28 having the drag brake mechanism disposed in the reel body 1.

A spring 31 is stretched between a pin 29 or 30 implanted into the reel body 1 and the long limiting arm 4*a* of the swing plate 4. The swing plate 4 abuts against a pin-like engagement stopper 32 engaged with a hole 1*d* or 1*e* of the reel body 1 to be urged, thereby limiting the swinging operation of the swing plate.

Figure 7:
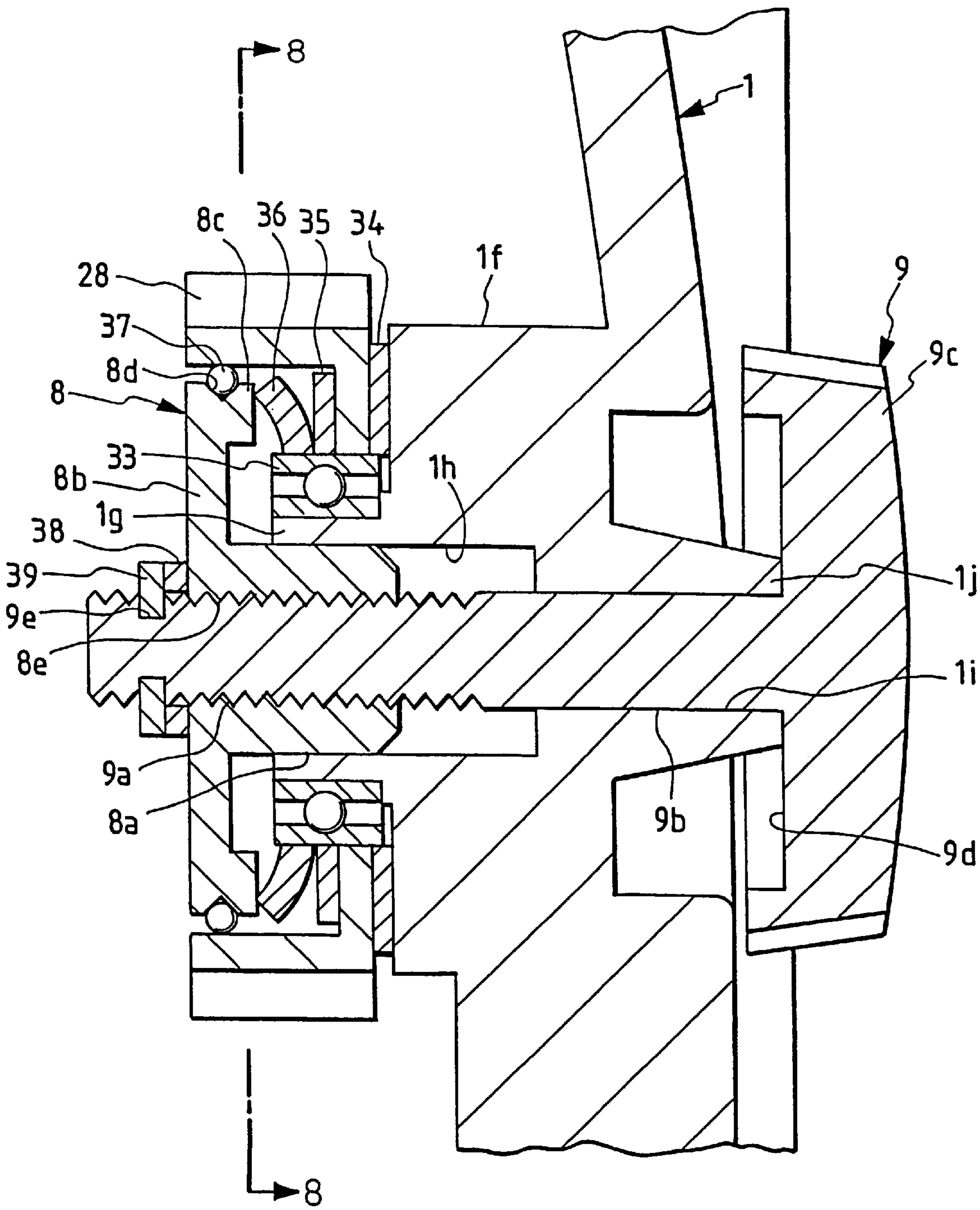
FIG. 7 is a section view of a drag brake mechanism.

In the reel body 1, as shown in FIGS. 1 and 7, a cylinder portion 1*f,* a cylinder portion 1*g* formed by a step, a locking hole 1*h* and a through hole 1*i* in the cylinder portion 1*g,* and a projection cylinder portion 1*j* outside the through hole 1*i* are formed.

A bearing 33 is fitted onto the outer periphery of the cylinder portion 1*g*.

The drag brake gear 28 is fitted onto the outer periphery of the bearing 33 so as to be opposed to the end face of the cylinder portion 1*f* via a friction plate 34.

A friction plate 35 and a plate spring 36 are fitted onto the outer periphery of the bearing 33.

Figure 8:
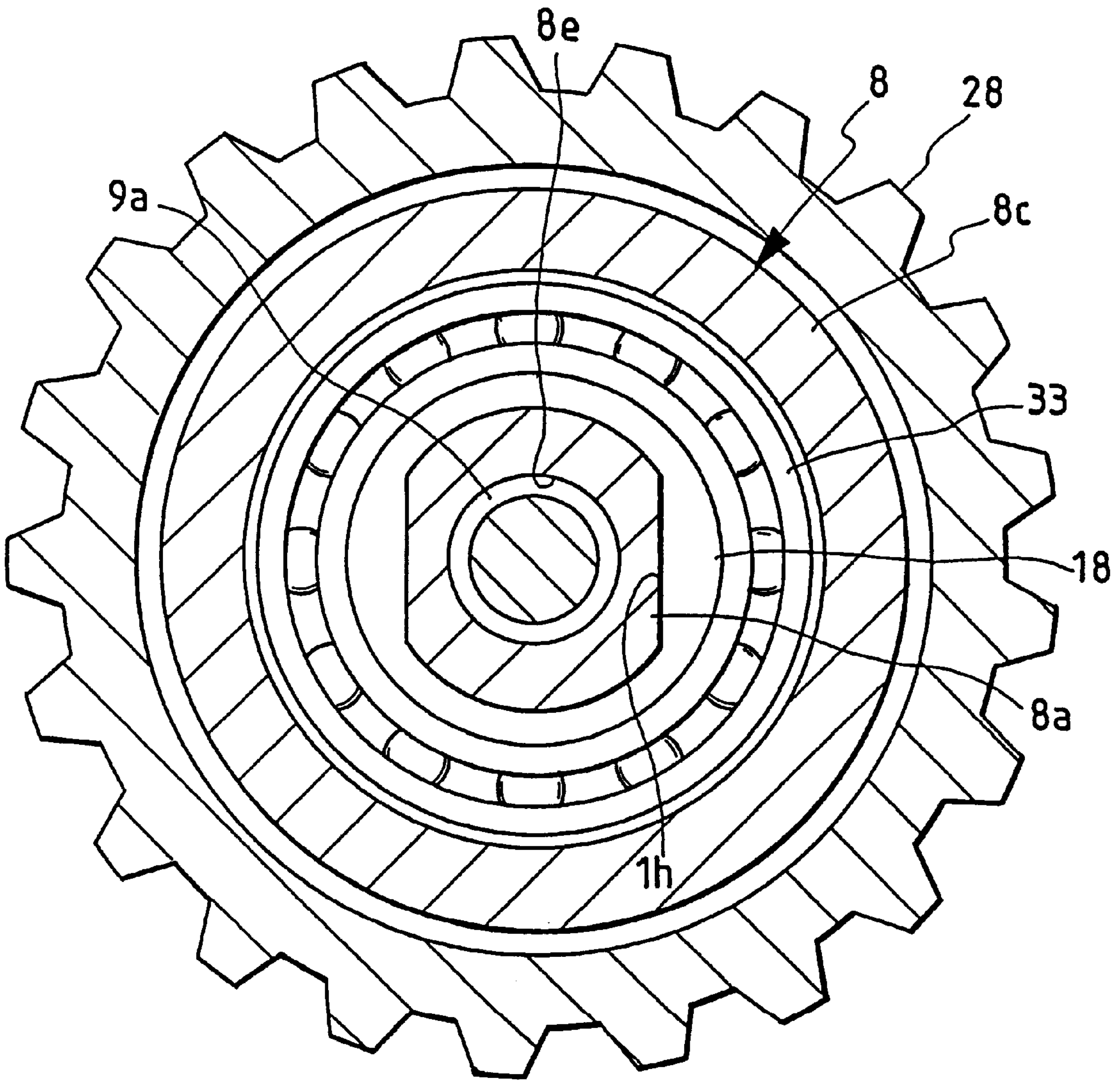
FIG. 8 is an enlarged section view of a drag brake mechanism, taken along line 8—8 in FIG. 7.

As shown in FIG. 8, a locking cylinder portion 8*a* of a brake member 8 is fitted into the locking hole 1*h*.

The swing plate 4, the transmission gears 26 and 27, the drag brake gear 28, the friction plate 34, the friction plate 35, the plate spring 36, and the brake member 8 constitute the drag brake mechanism.

As described above, the drag brake gear 28 is fitted onto the outer periphery of the bearing 33. Even when a force is applied in a radial direction during the drag brake operation, therefore, it is possible to attain a smooth drag brake of high durability.

The brake member 8 consists of the locking cylinder portion 8*a,* a flange-like plate portion 8*b,* a thick portion 8*c* which is on the side of the outer periphery of the flange-like plate portion 8*b,* a V-like groove 8*d* in the outer periphery of the thick portion 8*c,* and a tapped portion 8*e* in the inner periphery of the locking cylinder portion 8*a.*

The plate spring 36 abuts against the side face of the thick portion 8*c*.

An O-ring 37 is fitted into the V-like groove 8*d*. The O-ring 37 abuts against the inner peripheral face of a recess of the drag brake gear 28.

A screw shaft 9*a* and a shaft portion 9*b* of a brake adjust knob 9 are inserted into the through hole 1*i* and the locking hole 1*h,* from the outside of the projection cylinder portion 1*j* of the reel body 1.

The brake adjust knob 9 consists of the screw shaft 9*a,* the shaft portion 9*b,* a knob portion 9*c,* a recess 9*d* which is inside the knob portion 9*c,* and a peripheral groove 9*e* in the tip end of the screw shaft 9*a.*

The screw shaft 9*a* is screwed with the tapped portion 8*e* of the brake member 8.

A friction plate 38 is fitted onto the outer periphery of the tip end of the screw shaft 9*a,* and an E-ring 39 is fitted into the peripheral groove 9*e,* thereby preventing the brake member 8 from slipping off.

The recess 9*d* of the brake adjust knob 9 abuts against the projection cylinder portion 1*j* of the reel body 1.

When the reel is to be operated by the left-hand handle, the pin-like engagement stopper 32 is engaged with the hole 1*d* which is in the right side in FIG. 3, and the spring 31 is stretched between the pin 29 and the long limiting arm 4*a* of the swing plate 4.

When the reel is to be operated by the right-hand handle, the pin-like engagement stopper 32 is engaged with the hole 1*e* which is in the left side in FIG. 4, and the spring 31 is stretched between the pin 30 and the long limiting arm 4*a* of the swing plate 4.

The structure in which the pin-like engagement stopper 32 is engaged with the hole 1*d* or 1*e* may be realized by forming the hole as a tapped hole so as to attain screwing, or alternatively by fixing a magnet to the bottom of the hole so as to attain magnetic attraction.

When the rotating member 3 consisting of a spool is to be attached to the support shaft 2, the bent portion 5*d* in the upper portion of the engaging member 5 is pressed down against the spring 18, and the shaft cylinder 3*a* of the rotating member 3 consisting of a spool, and the bearings 10 and 11 are fitted onto the support shaft 2 so that the tip end 2*a* of the support shaft 2 is inserted into the large circular hole 5*b*.

When the pressing on the bent portion 5*d* of the engaging member 5 is canceled, the sliding portion 5*a* and the small circular hole 5*c* are raised by the spring 18 and the peripheral groove 2*b* of the support shaft 2 is inserted into and engaged with the small circular hole 5*c,* whereby the rotating member 3 consisting of a spool is caused to detachably engage with the support shaft 2.

When the knob 22 is to be replaced with another knob, the engaging member 23 such as a screw is loosened and the knob 22 is detached from the cylinder portion 7*a* of the cylinder member 7. Another knob is then fitted onto the outer periphery of the cylinder portion 7*a* and is prevented from slipping of, by the engaging member 23 such as a screw.

When the single bearing type fishing reel is to be operated by the left-hand handle, the pin-like engagement stopper 32 is engaged with the hole 1*d* which is in the right side in FIG. 3, and the spring 31 is stretched between the pin 29 and the limiting arm 4*a*.

As a result, the state is attained where the fishing line 15 is wound in a counterclockwise direction around the spool barrel 3*c* of the rotating member 3 consisting of a spool.

When the rotating member 3 consisting of a spool is rotated under this state in a counterclockwise direction in FIG. 3, a force is applied to the swing plate 4 so as to rotate the plate in a counterclockwise direction. However, the limiting arm 4*a* bumps against the engagement stopper 32 which is engaged in the right side, and hence the rotation of the swing plate 4 is limited.

At this time, since the rotation of the swing plate 4 is limited, the transmission gears 26 and 27 do not mesh with the drag brake gear 28.

Therefore, the rotating member 3 consisting of a spool is not subjected to a braking operation and can be easily rotated under only a load due to the fishing line 15.

When the rotating member 3 consisting of a spool is then to be rotated in a clockwise direction in order to unreel the fishing line 15, the rotation of the rotating member 3 consisting of a spool causes a rotation force in a clockwise direction to be applied to the swing plate 4. Then, the swing plate 4 is swung in a clockwise direction, and the transmission gear 26 meshes with the drag brake gear 28, so that the clockwise rotation of the rotating member 3 consisting of a spool is braked by the drag brake mechanism.

When the single bearing type fishing reel is to be operated by the right-hand handle, the pin-like engagement stopper 32 is engaged with the hole 1*e* which is in the left side in FIG. 4, and the spring 31 is stretched between the pin 30 and the limiting arm 4*a*.

As a result, the state is attained where the fishing line 15 is wound in a clockwise direction around the spool barrel 3*c* of the rotating member 3 consisting of a spool.

When the rotating member 3 consisting of a spool is rotated under this state in a clockwise direction in FIG. 4, a force is applied to the swing plate 4 so as to rotate the plate in a clockwise direction. However, the limiting arm 4*a* bumps against the left engagement stopper 32, and hence the rotation of the swing plate 4 is limited.

At this time, since the rotation of the swing plate 4 is limited, the transmission gears 26 and 27 do not mesh with the drag brake gear 28.

Therefore, the rotating member 3 consisting of a spool is not subjected to a braking operation and can be easily rotated under only a load due to the fishing line 15.

When the rotating member 3 consisting of a spool is then to be rotated in a counterclockwise direction in order to unreel the fishing line 15, the rotation of the rotating member 3 consisting of a spool causes a rotation force in a counterclockwise direction to be applied to the swing plate 4. Then, the swing plate 4 is swung in a counterclockwise direction, and the transmission gear 27 meshes with the drag brake gear 28, so that the counterclockwise rotation of the rotating member 3 consisting of a spool is braked by the drag brake mechanism.

According to the above-mentioned configuration of the fishing reel, when the knob 22 is to be replaced with another knob because of deterioration due to a lapse of use, sticking of seawater or water contents, the slime of fish, or the like, damages caused by contacts with foreign members, or other reasons, the knob can be easily detached by loosening the engaging member 23 such as a screw. Therefore, the most suitable knob can be selected and easily attached. Consequently, the replacement can be conducted very easily, and the holdability of the knob can be satisfactorily maintained for a long term.

Figure 9:
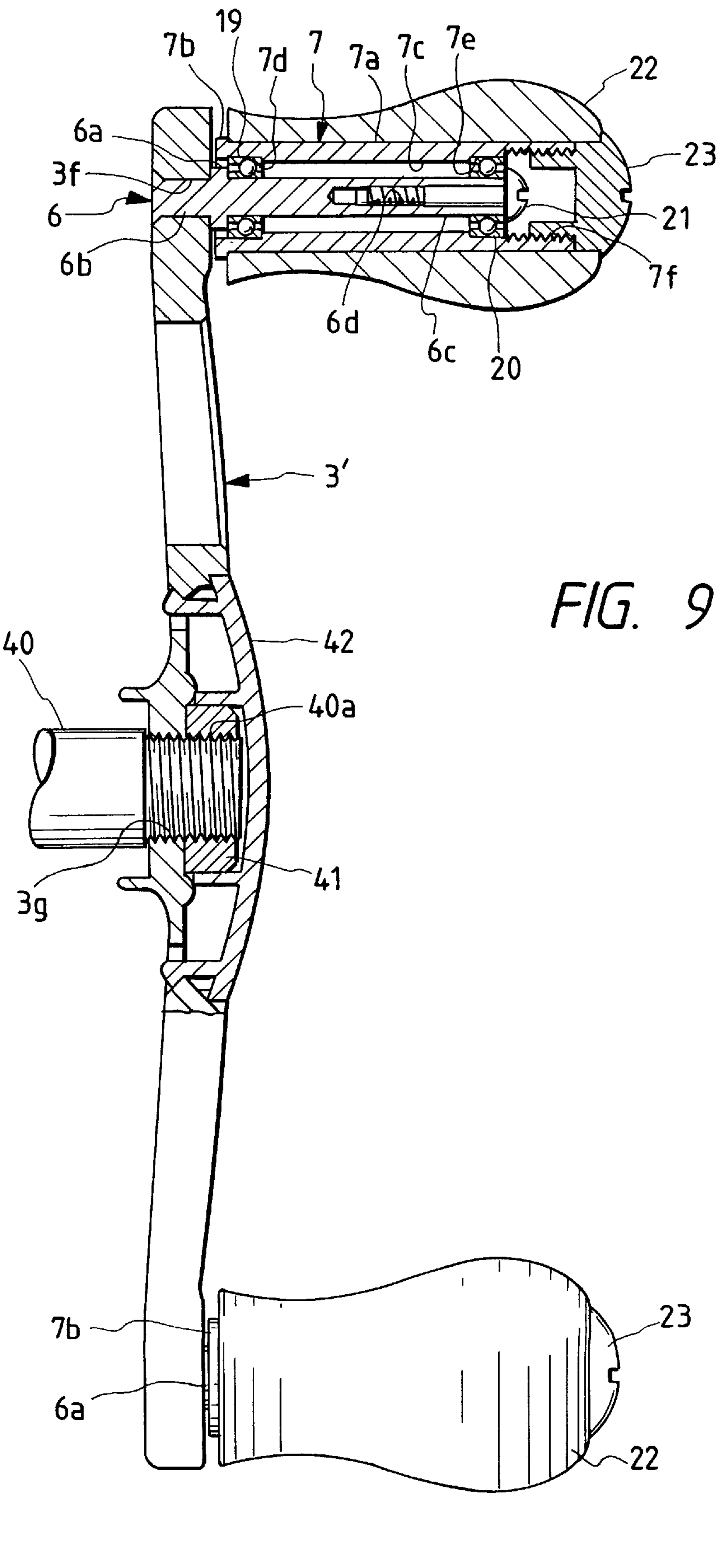
FIG. 9 is a partial enlarged section and plan view of a handle of a double bearing type fishing reel which is a second embodiment.

FIG. 9 shows a second embodiment. In this embodiment, a handle of the fishing reel is configured as a handle arm of a double bearing type fishing reel.

In the second embodiment, a flange 6*a* which is in one side of a support shaft 6 of a handle knob abuts against a through hole 3*f* which is formed at each end of a rotating member 3' consisting of a handle arm, and one end 6*b* of the support shaft is fixed thereto by means of press fitting.

A tapped hole 3*g* is formed at the center in the longitudinal direction of the rotating member 3' consisting of a handle arm, a tapped portion 40*a* in one end of a handle shaft 40 is screwed with the hole, and a nut 41 is screwed with the tapped portion 40*a* so that the handle shaft is locked.

The nut 41 is locked by a cover 42 attached to the rotating member 3' consisting of a handle arm. The other components are configured in a substantially same manner as those of the first embodiment.

In the above description, the handles are used for a single bearing type fishing reel and a double bearing type fishing reel. However, the invention may also be applied to a handle of a fishing spinning reel.

The invention is executed in the mode described above, and attains the following effects.

When a knob is to be replaced with another knob because of deterioration due to a lapse of use, sticking of seawater or water contents, the slime of fish, or the like, damages caused by contacts with foreign members, or other reasons, the knob can be easily detached by loosening an engaging member such as a screw. Therefore, the most suitable knob can be selected and easily attached. Consequently, the replacement can be conducted very easily, and the holdability of the knob can be satisfactorily maintained for a long term.

What is claimed is:

1. A handle of a fishing reel having a rotating member used to wind a fishing line around a spool, said handle comprising:

a support shaft protruding from said rotating member;

a cylinder member rotatably supported on said support shaft;

a handle knob mounted on an outer cylindrical surface of said cylinder member;

an engaging member detachably retaining said handle knob onto said cylinder member; and a flange radially outwardly protruded from a first end of said cylinder member, wherein said engaging member includes a screw threadingly engaged with an inner cylindrical surface of said cylinder member at a second end opposite from said first end, and said handle knob is held between said flange and a head portion of said screw.

2. A handle according to claim 1, further comprising:

first and second large inner diameter portions formed in said cylinder member;

a small inner diameter portion formed in said cylinder member and located between said first and second large inner diameter portions;

another flange radially outwardly protruded from said support shaft;

another screw threadingly engaged with said support shaft;

a first bearing radially interposed between said first large inner diameter portion and said support shaft and longitudinally interposed and held between said small inner diameter portion and said another flange; and a second bearing radially interposed between said second large inner diameter portion and said support shaft and longitudinally interposed and held between said small inner diameter portion and a head of said another screw.

3. A handle according to claim 1, further comprising:

another screw threadingly engaged with said support shaft.

* * * * *